F. M. PATTERSON.
PIPE FLANGING MACHINE.
APPLICATION FILED NOV. 8, 1911.

1,054,865.

Patented Mar. 4, 1913.

2 SHEETS—SHEET 2.

UNITED STATES PATENT OFFICE.

FRANKLIN M. PATTERSON, OF BAYONNE, NEW JERSEY, ASSIGNOR TO PATTERSON-ALLEN ENGINEERING COMPANY, A CORPORATION OF NEW YORK.

PIPE-FLANGING MACHINE.

1,054,865.  Specification of Letters Patent.  Patented Mar. 4, 1913.

Application filed November 8, 1911. Serial No. 659,097.

*To all whom it may concern:*

Be it known that I, FRANKLIN M. PATTERSON, a citizen of the United States, and a resident of Bayonne, county of Hudson, State of New Jersey, have invented an Improvement in Pipe-Flanging Machines, of which the following is a specification.

My invention has reference to improvements in pipe flanging machines and consists of certain improvements which are fully set forth in the following specification and shown in the accompanying drawings which form a part thereof.

The object of my invention is to provide a suitable machine for expanding a pipe end within the pipe flange for forming a union between said parts and preferably by expanding a rib on the pipe into an internal groove on the flange, and moreover without subjecting the flange or the pipe to longitudinal thrust during the operation.

My invention is more particularly intended for large pipe diameters, but is not restricted in this respect.

My invention consists of a suitable housing for supporting and holding the pipe flange and receiving the pipe end, combined with an expanding die divided into a plurality of sections adapted to operate upon the interior of the pipe in a radial direction toward the flange, a plurality of hydraulic cylinders, plungers, the latter respectively operating upon the sections of the die, and controlling means for operating the hydraulic cylinders and plungers whereby the die may be simultaneously expanded throughout its circumference; the pipe flange supporting housing on the one part and the dies on the other being preferably formed with capacity for relative adjustment circumferentially, to permit the position of the die sections to be shifted relatively with respect to the interior of the pipe.

My invention also comprehends details of construction which, together with the features above specified, will be better understood by reference to the drawings, in which:—

Figure 1:
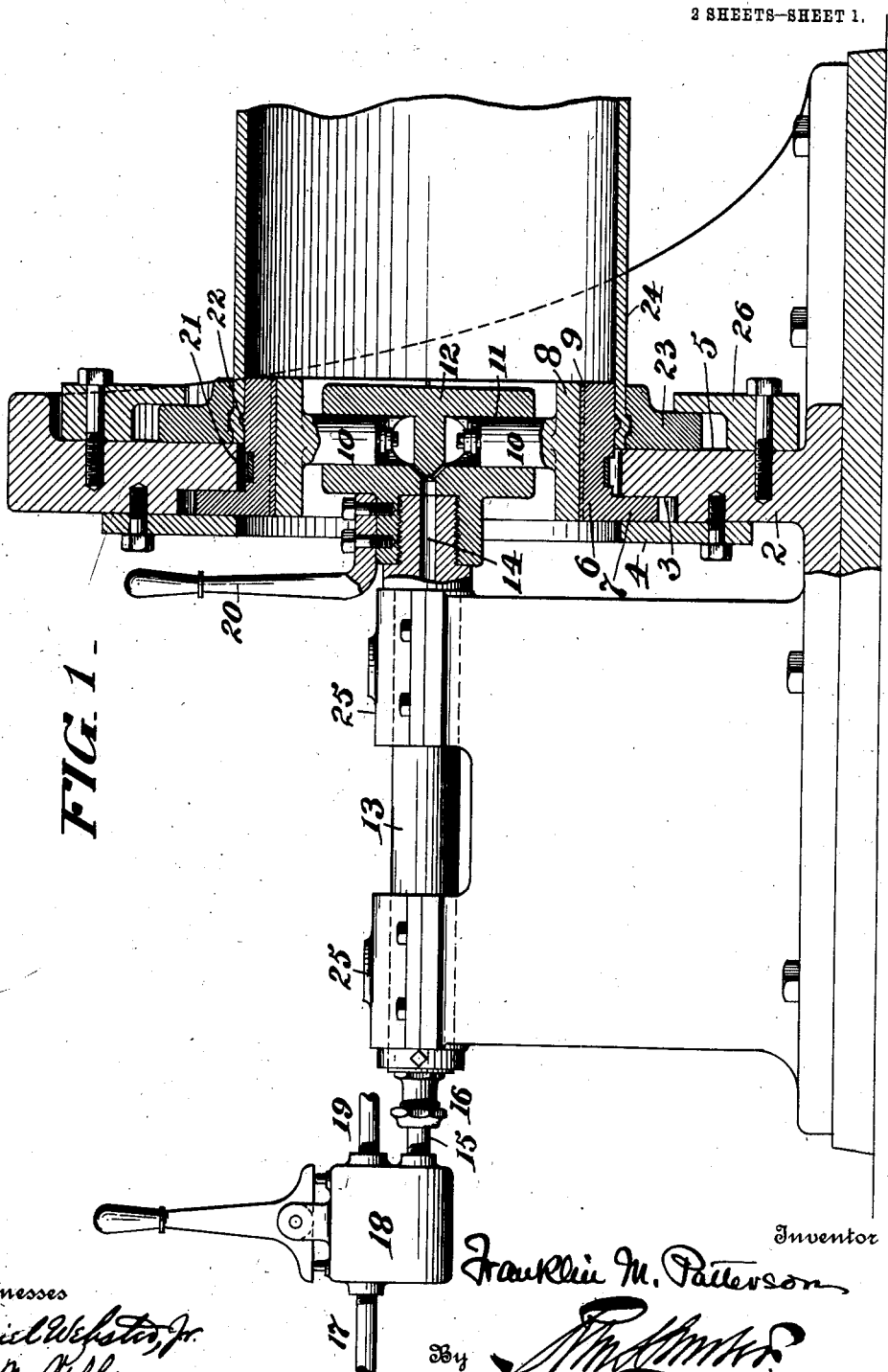
Figure 2:
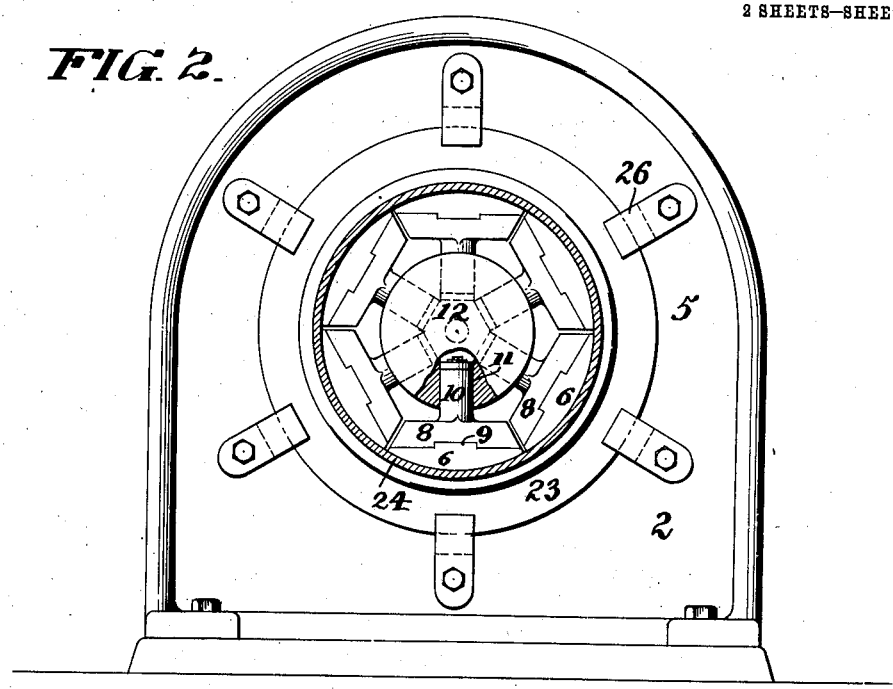
Figure 3:
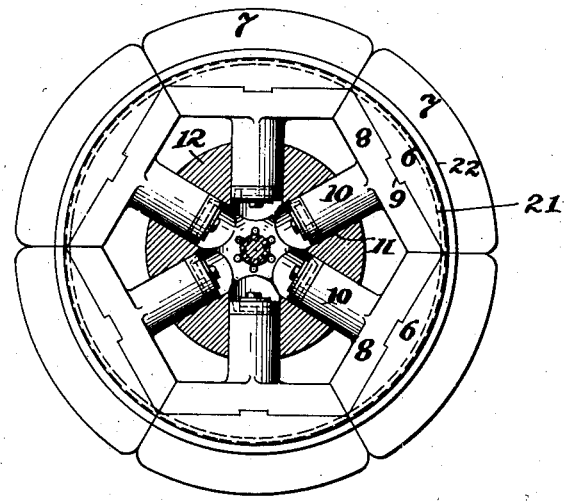

Figure 1 is a side elevation of a pipe flanging machine embodying my improvements with part in section; Fig. 2 is a front elevation of the same, also having part in section; and Fig. 3 is an elevation of the expanding dies and plungers and with the cylinders in cross section.

2 is the main frame or housing and is provided with a large central aperture and is recessed on one side, as at 3, over which is bolted an annular plate 4, so that the recessed portion becomes an annular radial groove. The expanding die consists of a plurality of sections 6 which, when placed together, provide an outer cylindrical surface having a circumferential rib 22. These sections 6 are also provided at one end with radial flanges 7 which are received in the circumferential groove formed by the recess 3 and the plate 4. In this manner, the die sections are held in proper relative relation, and are positively positioned in the housing, but without restraint to proper normal movement both radially and circumferentially. A spring band 21 placed about the several sections of the die, normally tend to bring these sections together to the position indicated in Fig. 3, at which time, the die has its smallest diameter. The opposite facing 5 of the housing acts as a support for the pipe flange 23 which may be clamped in position by the clamps 26. The pipe 24 is placed within the flange and between it and the die sections 6, as will be clearly understood by reference to Fig. 1. It is ordinarily customary to provide a groove upon the inner surface of the flange 23 into which the pipe is expanded by the rib 22 on the die sections.

13 is a tubular shaft carried in bearings 25 rigidly secured to the main frame or housing 2, so that the shaft is axially coincident with the center of the aperture through the housing and the normal center of the die sections. Secured to the end of this tubular shaft 13 is a head 12 having a plurality of hydraulic cylinders 11 arranged radially about said head and having their inner ends in communication with each other and with the passage 14 extending through the tubular shaft 13. Each of the hydraulic cylinders 11 is provided with a plunger 10, the outer end of which is provided with a platen 8 which directly acts upon one of the sections 6 of the die. To prevent shifting of the die sections upon the platen, the two may be provided with a tongue and groove connection 9 of any suitable construction. This will prevent circumferential displacement of the die sections relatively to their platens, whereas, the flange 7, working in the groove in the housing, will prevent longitudinal displacement of the die sections. Furthermore, the tongue and groove connection 9, as well as the polygonal outer shape of the platens, will enable the dies to be circumferentially shifted after each expanding operation by rocking the shaft 13 and the head 12, which movement may be accomplished by means of the handle 20. It will be understood, that when the pipe is expanded into the flange by one radial movement of the hydraulic plungers, there will be small spaces between the expanding sections of the die which will not be fully expanded, and therefore upon retracting the plungers, the head 12, together with the plungers and the die sections, is shifted circumferentially to a slight extent, preferably through an arc equal to one-half the circumferential length of the sections 6, and then the expanding operation repeated to complete the union between the pipe and the flange.

18 is a control valve for supplying water, under pressure from the pipe 17, through the pipe 15 and the stuffing box 16 into the tubular passage 14 of the shaft 13, and also for permitting the escape of the water from the cylinders through exhaust pipe 19 when the dies are to be contracted. This control valve 18 may be of any suitable character, there being many well known forms of control valves used in connection with hydraulic machines. I prefer, however, the well known construction which is illustrated in the Patent No. 956,253, dated April 26, 1910, though I do not restrict myself thereto. Any other manner of supplying and controlling the pressure to the hydraulic cylinders may be employed. In the manner shown, the pressure simultaneously acts upon all of the plungers, and consequently, the expanding pressure on the inside of the pipe is uniform throughout its circumference.

I have shown my invention in the form which I prefer, but it is to be understood that the details may be modified or varied without departing from the spirit of the invention. For example, it is quite evident that while I have shown the expanding die in six sections, the number of sections may be varied according to the diameter of the pipe; also, whereas the relative circumferential movement between the housing, with its flange and the dies, is preferably accomplished by shifting the dies within the stationary flange and the housing, said relative movement may be accomplished in any other suitable manner, and likewise, the coöperative relation of the various parts may be changed or modified to suit any particular conditions which may arise, without being considered a departure from the invention.

Having now described my invention, what I claim as new and desire to secure by Letters Patent, is:—

1. In a pipe flanging machine, the combination of a housing for supporting and guiding the pipe flange, an expanding die arranged within the housing for expanding the pipe end in the flange and formed of a plurality of circumferentially arranged sections, a plurality of hydraulic cylinders arranged centrally within the die, a plurality of plungers for said cylinders, each plunger operating upon one section of the die for moving it radially, and means for controlling pressure fluid simultaneously to the plurality of cylinders.

2. In a pipe flanging machine, the combination of a housing for supporting and guiding the pipe flange, an expanding die arranged within the housing for expanding the pipe end in the flange and formed of a plurality of circumferentially arranged sections, continuously acting means for moving the sections of the die radially inward, a plurality of hydraulic cylinders arranged centrally within the die, a plurality of plungers for said cylinders, each plunger operating upon one section of the die for moving it radially and normally moved inward in its cylinder by the action of the die segments, and means for controlling the supply of pressure fluid simultaneously to the plurality of cylinders.

3. In a pipe flanging machine, the combination of a main frame, a housing on the main frame for supporting and guiding the pipe flange, an expanding die arranged within the housing for expanding the pipe end in the flange and formed of a plurality of circumferentially arranged sections, a plurality of hydraulic cylinders arranged centrally within the die and supported by the main frame, a plurality of plungers for said cylinders, each plunger operating upon one section of the die for moving it radially, means for imparting a relatively circumferential movement between the housing and the die, and means for controlling the supply of pressure fluid simultaneously to the plurality of cylinders while permitting the relative circumferential movement thereof.

4. In a pipe flanging machine, the combination of a main frame, a housing on the main frame for supporting and guiding the pipe flange, an expanding die arranged within the housing for expanding the pipe end in the flange and formed of a plurality of circumferentially arranged sections, a plurality of hydraulic cylinders arranged centrally within the die and supported by the main frame, a plurality of plungers for said cylinders, each plunger operating upon one section of the die for moving it radially, means for producing a circumferential rocking of the cylinders and their plungers for adjusting the die circumferentially within the housing, and means for controlling the supply of pressure fluid simultaneously to the plurality of cylinders while permitting the relative circumferential adjustment thereof.

5. In a pipe flanging machine, the combination of a main frame, a housing carried by the main frame, an annular die divided into sections and supported by the housing with provision for radial movement but held against longitudinal movement, a rotatable shaft journaled on the main frame, a cylinder head secured to the shaft and provided with a plurality of radially arranged cylinders, a plurality of plungers for the cylinders and each connecting with one of the sections of the die, and means for adjusting the head together with its plungers and die sections circumferentially about the axis of the shaft, and means to supply pressure fluid simultaneously to the plurality of cylinders for all positions of circumferential adjustment thereof.

6. In a pipe flanging machine, the combination of a housing, an annular die divided into sections and supported by the housing with provision for radial movement but held against longitudinal movement, a rotatable shaft, a main frame for positively holding the shaft in definite relation to the housing, a cylinder head secured to the shaft and provided with a plurality of radially arranged cylinders, a plurality of plungers for the cylinders and each connecting with one of the sections of the die, and means for adjusting the head together with its plungers and die sections circumferentially about the axis of the shaft, means to supply pressure fluid simultaneously to the plurality of cylinders and also for exhausting the fluid therefrom for all positions of adjustment, and means for moving the sections of the die toward each other and forcing the plungers into the cylinders.

In testimony of which invention, I hereunto set my hand.

FRANKLIN M. PATTERSON.

Witnesses:
JOHN H. AMES,
WM. F. MADILL.